T862021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1010

794,405

DERIVATIVES OF BENZO[f]QUINAZOLINE AS ANTIFOGGANTS FOR PHOTOGRAPHIC MATERIALS

Norman W. Kalenda and Dorothy J. Beavers, both % Kodak Park Division, Rochester, N.Y. 14650

Filed Jan. 27, 1969. Published May 27, 1969
**Int. Cl. G03c *1/34***
U.S. Cl. 96—109
No Drawing. 13 Pages Specification

Photographic silver halide materials are stabilized against fog with benzo[f]quinazolines having the general formula:

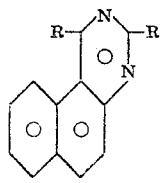

where each R is —H, —$NH_2$, —NHR′, —$NR'_2$, —SH, —SR′, —OH, —OR′, —$NO_2$, —COOH, —COOR′, or halogen, each R′ being alkyl, e.g., methyl, ethyl, butyl, and the like. Examples of suitable antifoggants are 1,3-diaminobenzo[f]quinazoline, 1-hydroxybenzo[f]quinazoline, 1-mercaptobenzo[f]quinazoline, and 1-hydroxy-3-aminobenzo[f]quinazoline.

Silver halide emulsions and elements stabilized as described can be chemically sensitized, e.g., with noble metal sensitizers alone or in combination with sulfur or selenium sensitizers. They can contain spectral sensitizers, incorporated color-forming couplers, incorporated developing agents, other antifoggants, hardeners, plasticizers, coating aids, vinyl polymers, and other suitable photographic addenda such as described in U.S. Patent 3,297,446 of Dunn issued Jan. 10, 1967 (columns 4–9).